United States Patent
Rune et al.

(10) Patent No.: US 9,220,088 B2
(45) Date of Patent: Dec. 22, 2015

(54) METHOD AND ARRANGEMENT FOR ADAPTING GUARD TIME BASED ON TIMING ADVANCE

(75) Inventors: Johan Rune, Lidingö (SE); Erik Eriksson, Linköping (SE); Niclas Wiberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 209 days.

(21) Appl. No.: 13/996,116

(22) PCT Filed: Dec. 30, 2010

(86) PCT No.: PCT/SE2010/051496
§ 371 (c)(1),
(2), (4) Date: Jun. 20, 2013

(87) PCT Pub. No.: WO2012/091645
PCT Pub. Date: Jul. 5, 2012

(65) Prior Publication Data
US 2013/0288698 A1    Oct. 31, 2013

(51) Int. Cl.
| | | |
|---|---|---|
| H04W 72/00 | (2009.01) | |
| H04W 72/04 | (2009.01) | |
| H04W 52/02 | (2009.01) | |
| H04W 74/08 | (2009.01) | |
| H04W 28/04 | (2009.01) | |
| H04W 28/18 | (2009.01) | |
| H04W 84/18 | (2009.01) | |
| H04W 88/08 | (2009.01) | |

(52) U.S. Cl.
CPC .......... *H04W 72/04* (2013.01); *H04W 52/0216* (2013.01); *H04W 74/08* (2013.01); *H04W 28/048* (2013.01); *H04W 28/18* (2013.01); *H04W 84/18* (2013.01); *H04W 88/08* (2013.01)

(58) Field of Classification Search
USPC .............. 455/446, 447, 449, 450, 451, 452.1, 455/452.2, 455
See application file for complete search history.

(56) References Cited

U.S. PATENT DOCUMENTS

| | | | |
|---|---|---|---|
| 2003/0026215 A1* | 2/2003 | Schafer .................. | 370/280 |
| 2008/0074996 A1* | 3/2008 | Fourcand .................. | 370/225 |
| 2013/0203424 A1* | 8/2013 | Van Phan et al. .......... | 455/448 |

FOREIGN PATENT DOCUMENTS

| | | |
|---|---|---|
| EP | 2104369 A1 | 9/2009 |
| WO | 2004004138 A2 | 1/2004 |
| WO | 2010057540 A1 | 5/2010 |
| WO | 2010123430 A1 | 10/2010 |

* cited by examiner

*Primary Examiner* — Suhail Khan
(74) *Attorney, Agent, or Firm* — Coats & Bennett, PLLC

(57) ABSTRACT

A method in a base station for selecting a set of transport format schemes for a cell is provided. The set of transport format schemes shall be used for a radio transmission from a communication device to the base station. The base station is serving the eel! comprising the communication device. The communication device is unsynchronized for transmission to the base station. The base station specifies (201) a plurality of sets of transport format schemes. Each set of transport format schemes is associated to a respective guard time, which guard time is a time margin required to compensate for the communication device being unsynchronized for transmission to the base station. After determining (203) a required guard time as the maximum timing advance value used in the cell the base station selects (204) one set of transport format schemes from the plurality of sets of transport format schemes to be available for the cell. The set is selected such that its associated guard time matches the determined required guard time in the cell.

20 Claims, 3 Drawing Sheets

METHOD AND ARRANGEMENT FOR ADAPTING GUARD TIME BASED ON TIMING ADVANCE

TECHNICAL FIELD

Embodiments herein relate to a base station, a communication device and methods therein. In particular, it relates to selecting a set of transport format schemes for a cell.

BACKGROUND

Communication devices such as mobile stations are also known as e.g. mobile terminals, wireless terminals and/or User Equipments (UEs). Mobile stations are enabled to communicate wirelessly in a cellular communications network or wireless communication system, sometimes also referred to as a cellular radio system. The communication may be performed e.g. between two mobile stations, between a mobile station and a regular telephone and/or between a mobile station and a server via a Radio Access Network (RAN) and possibly one or more core networks, comprised within the cellular communications network.

Mobile stations may further be referred to as mobile telephones, cellular telephones, or laptops with wireless capability, just to mention some further examples. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the mobile stations within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spêcial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies.

According to 3GPP/GERAN, a mobile station has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, the expression DownLink (DL) is used for the transmission path from the base station to the mobile station. The expression UpLink (UL) is used for the transmission path in the opposite direction i.e. from the mobile station to the base station.

A vision of a development of the communication in cellular networks comprises huge numbers of small autonomous devices, which typically, more or less infrequently, e.g. once per week to once per minute, transmit and receive only small amounts of data. These devices are assumed not to be associated with humans, but are rather sensors or actuators of different kinds, which communicate with application servers, which configure the devices and receive data from them, within or outside the cellular network. Hence, this type of communication is often referred to as machine-to-machine (M2M) communication and the devices may be denoted machine devices (MDs). In the 3GPP standardization the corresponding alternative terms are machine type communication (MTC) and machine type communication devices (MTC devices). Note that in a wider context an MTC device is just another type of User Equipment, albeit with certain special characteristics.

With the nature of MTC devices and their assumed typical uses follow that they will often have to be very power efficient, since external power supplies will often not be available and since it is neither practically nor economically feasible to frequently replace their batteries.

Regarding MTC devices, the M2M activity in future radio access development is considering an alternative access mode, based on contention. A generic term for such an access mode is Contention-Based Protocol (CBP). A CBP is a communications protocol for operating wireless or wireline telecommunication equipment that allows many users to use the same radio channel, or wire or other physical resource, without pre-coordination. One such access mode that has been discussed in 3GPP is often referred to as Contention Based (CB) access. It allows any UL synchronized UE to transmit UE data using a certain UL radio resource without having received a prior dedicated allocation of the resource. A UE with UL synchronization knows in what time instants it may transmit in the UL in order for its transmissions to arrive at the base station in a manner that is synchronized with other UL transmissions from other UEs, so that the UL transmissions from different UEs which are intended to arrive at the base station in sequence to not overlap each other in time and thus do not interfere with each other. Closely related to the concept of UL synchronization is the term timing advance (TA) which defines a relation between DL and UL transmissions in a UE and which is used by a UE to derive the correct UL transmission time instants. The timing advance is the time difference between a UE's transmission in the UL and the start of a transmission resource, e.g. a subframe in LTE, in the DL as perceived by the UE. That is, a UE transmits UL data slightly before the UL transmission resource (e.g. LTE subframe) boundary as perceived from the DL receptions. Thus, in essence, timing advance is a negative offset, at the UE, between the start of a received DL resource, e.g. LTE sub-frame, and an UL transmission, e.g. a transmitted UL sub-frame in LTE. This negative offset is used to compensate for the propagation delay on the distance from the radio base station to the UE and back again. The radio base station monitors the timing misalignments in its receptions from UEs and sends timing advance commands, e.g. in a Medium Access Control (MAC) control element in a MAC Protocol Data Unit in LTE, in the form of relative changes, to UEs when needed.

In WO2010/057540, which discloses the CB access mode, access for unsynchronized user equipments is mentioned. To cope with the transmission and reception timing misalignment resulting from the lack of UL synchronization it is disclosed to reserve the resource blocks following the CB resource blocks and not schedule any transmission in these resource blocks. A resource block in LTE terminology is a set of resource elements, where a resource element is a small entity in a time-frequency grid, i.e. a transmission resource consisting of a certain bandwidth in the radio frequency dimension and a certain length of time in the time dimension and wherein one resource block carries one Orthogonal Frequency Division Multiplexing (OFDM) symbol. An OFDM symbol is a radio modulation symbol, i.e. the smallest information carrying unit in the radio communication, representing one or several data bits depending on the applied modulation scheme. In LTE the bandwidth of a resource element is 15 kHz and a resource block consists of 12 "sub-carriers" with a bandwidth of 15 kHz each, yielding a total resource block bandwidth of 180 kHz. In the time dimension an LTE resource block is 0.5 ms and typically comprises 7 resource elements (and thus 7 OFDM symbols) on each sub-carrier. This results in a total of 12×7=84 resource elements (and thus 84 OFDM symbols) per resource block in LTE. In the context of this document the term "Opportunistic Transmission Mode" (OTM) is used to denote any CBP, which would allow any machine device, with or without UL synchronization, to transmit using an allocated UL resource.

MTC devices without UL synchronization will not be able to transmit with enough timing accuracy, they require larger guard times than synchronized MTC devices and/or user equipments. A guard time is a time margin used after a transmission to ensure that the transmission does not overlap and interfere with a later transmission from another UE using the same frequency or frequencies. This is a problem since existing transport formats are inherently adapted to the size of the possible resource allocations. Providing guard times in the form of, and with the granularity of, entire resource blocks is however wasteful in terms of system resources and results in resource inefficient transmissions.

A further complication is that cells vary a lot in size, sometimes in ways not predicted at the cell planning. Hence, the maximum guard time requirements will vary with different cell sizes. The reason for this is that the required guard time depends on the distance between the UE and the base station, as its purpose is to provide sufficient margin for an otherwise uncompensated, as an unsynchronized UE is assumed, distance-dependent propagation delay. A solution that provides sufficient guard time margins for large cells will result in unnecessarily large guard times when used in small cells, which in turn means that OTM/CB resources are inefficiently used and system resources are wasted.

A very large cell, e.g. 100 km radius has a cell edge to radio base station roundtrip propagation delay of 0.67 ms, corresponding to eight extended Orthogonal Frequency Division Multiplexing (OFDM) symbols in LTE, wherein an OFDM symbol is a radio modulation symbol, i.e. the smallest information carrying unit in the radio communication, representing one or several data bits depending on the applied modulation scheme. Propagation delay is the time it takes for radio transmission, i.e. electromagnetic radiation, to propagate a certain distance.

As a comparison, the largest guard time from the different specified LTE Random Access preamble formats is 0.72 ms, corresponding to almost nine extended OFDM symbols.

Thus, if the propagation delay from a UE without UL synchronization is not compensated for, e.g. by an increased guard time, it may interfere with significant parts (e.g. several OFDM symbols) of a transmission from another UE which were intended to arrive at the base station after the transmission from the UE without UL synchronization. This may ruin at least part of the reception of the transmissions from both UEs, causing decreased transmission quality and/or retransmissions, increased power consumption, increased delays and poor resource utilization

SUMMARY

It is therefore an object of embodiments herein to provide a way of improving radio access performance for unsynchronized communication devices.

According to a first aspect of embodiments herein, the object is achieved by a method in a base station for selecting a set of transport format schemes for a cell. The set of transport format schemes shall be used for a radio transmission from a communication device to the base station. The base station is serving the cell comprising the communication device. The communication device is unsynchronized for transmission to the base station. The base station specifies a plurality of sets of transport format schemes. Each set of transport format schemes is associated to a respective guard time, which guard time is a time margin required to compensate for the communication device being unsynchronized for transmission to the base station. After determining a required guard time as the maximum timing advance value used in the cell the base station selects one set of transport format schemes from the plurality of sets of transport format schemes to be available for the cell. The set is selected such that its associated guard time matches the determined required guard time in the cell.

According to a second aspect of embodiments herein, the object is achieved by a method in a communication device for selecting a transport format scheme. The transport format scheme shall be used for a radio transmission of an amount of data from the communication device to a base station. The base station is serving a cell comprising the communication device, and which communication device is unsynchronized for transmission to the base station. The communication device obtains a set of transport format schemes available for said cell. The transport format schemes is associated to a guard time required in the cell, which guard time is a time margin required to compensate for the communication device being unsynchronized for transmission to the base station. The communication device then selects a transport format scheme from the set of transport format schemes available for said cell. The selection is based on at least one of: the amount of data to be transmitted, a size of an allocated resource to be used for the data transmission and an uplink radio transmission condition.

According to a third aspect of embodiments herein, the object is achieved by a base station for selecting a set of transport format schemes for a cell. The set of transport format schemes shall be used for a radio transmission from a communication device to the base station. The base station is arranged to serve the cell comprising the communication device. The communication device is unsynchronized for transmission to the base station. The base station comprises a specifying unit configured to specify a plurality of sets of transport format schemes. Each set of transport format schemes is associated to a respective guard time, which guard time is a time margin required to compensate for the communication device being unsynchronized for transmission to the base station. The base station further comprises a determining unit configured to determine a required guard time as the maximum timing advance value used in the cell. The base station further comprises a selecting unit configured to select one set of transport format schemes from the plurality of sets of transport format schemes to be available for the cell. The set is selected such that its associated guard time matches the determined required guard time in the cell.

According to a fourth aspect of embodiments herein, the object is achieved by a communication device for selecting a transport format scheme. The transport format scheme shall be used for a radio transmission of an amount of data from the communication device to a base station. The base station is arranged to serve a cell comprising the communication device. The communication device is unsynchronized for transmission to the base station. The communication device comprises an obtaining unit configured to obtain a set of transport format schemes available for said cell. The transport format schemes are associated to a guard time required in the cell, which guard time is a time margin required to compensate for the communication device being unsynchronized for transmission to the base station. The communication device further comprises a selecting unit configured to select a transport format scheme from the set of transport format schemes available for said cell. The selection is based on at least one of: the amount of data to be transmitted, a size of an allocated resource to be used for the data transmission and an uplink radio transmission condition.

Since the required guard time is determined as the maximum timing advance value used in the cell and since the base station selects one set of transport format schemes to be available for the cell such that its associated guard time matches the determined required guard time in the cell, transmissions by an unsynchronized communication device using one of the available transport formats can be performed with an adapted guard time. This in turn results in an improved radio access performance for unsynchronized communication devices.

An advantage with embodiments herein is that they enable communication devices without uplink synchronization to transmit with efficient use of the OTM resources without inter-symbol interference and without excessive waste of system resources.

A further advantage with embodiments herein is that they enable OTM transmission for unsynchronized communication devices without the need for a prior Random Access procedure for UL synchronization acquisition, thereby saving both power and access delay.

A further advantage with embodiments herein is that they avoid resource wasteful transmissions, save system resources and make the system more power efficient.

A further advantage with embodiments herein is that the adaptive part of the embodiments requires no configuration and is a good example of a Self-Organizing Network (SON) feature. SON is a concept for making communication networks simpler and cheaper to deploy, maintain and operate, comprising various features for autonomous configuration, tuning and optimization of system parameters, thereby minimizing the required manual work while at the same time hopefully providing configuration and tuning closer to optimum values.

BRIEF DESCRIPTION OF THE DRAWINGS

Examples of embodiments herein are described in more detail with reference to attached drawings in which.

DETAILED DESCRIPTION

Embodiments will be exemplified in the following non-limiting description.

Figure 1:
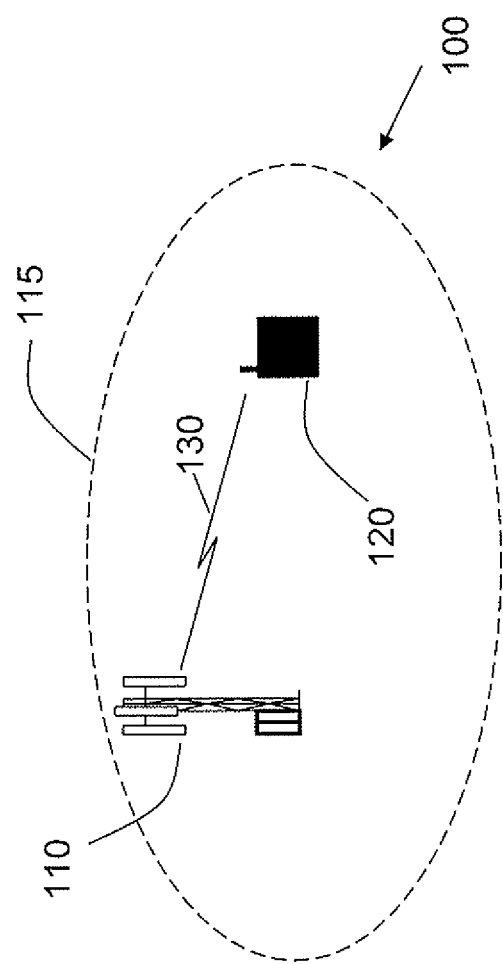
FIG. 1 is a schematic block diagram illustrating embodiments in a cellular communications network.

FIG. 1 depicts a cellular communications network 100 in which embodiments herein may be implemented. The cellular communications network 100 is a cellular communication network such as an LTE, WCDMA, GSM network, any 3GPP cellular network, or any cellular network or system.

In some embodiments the cellular communications network 100 implements an OTM access mode.

The cellular communications network 100 comprises a base station 110. The base station 110 is a radio base station serving a cell 115. The base station 110 may e.g. be a radio base station such as an eNB, eNodeB, or a Home Node B, a Home eNode B, a GSM/EDGE radio base station or any other network unit capable to serve a user equipment or a machine type communication device in a cellular communications system.

A communication device 120 is located within the cell 115. The communication device 120 is configured to communicate within the cellular communications network 102 via the base station 110 over a radio link 130 when the communication device 120 is present in the cell 115 served by the base station 110.

The communication device 120 may be a user equipment such as e.g. a mobile terminal or a wireless terminal, a mobile phone, a computer such as e.g. a laptop, Personal Digital Assistant (PDA), or any other radio network unit capable to communicate over a radio link in a cellular communications system.

The communication device 120 may also be a machine type communication device, i.e. a small autonomous device, such as e.g. a machine-to-machine communication device, a machine device which typically, more or less infrequently, e.g. once per week to once per minute, transmits and receives only small amounts of data.

Embodiments herein relate to unsynchronized communication devices, and provides transport formats with adapted guard times. The adapted guard times are to be used by unsynchronized communication devices for uplink transmission using an allocated uplink resource, to compensate for the not being synchronized.

Therefore the communication device 120 is unsynchronized for transmission to the base station 110, i.e. the communication device 120 is without uplink synchronization to the base station 110.

Figure 2:
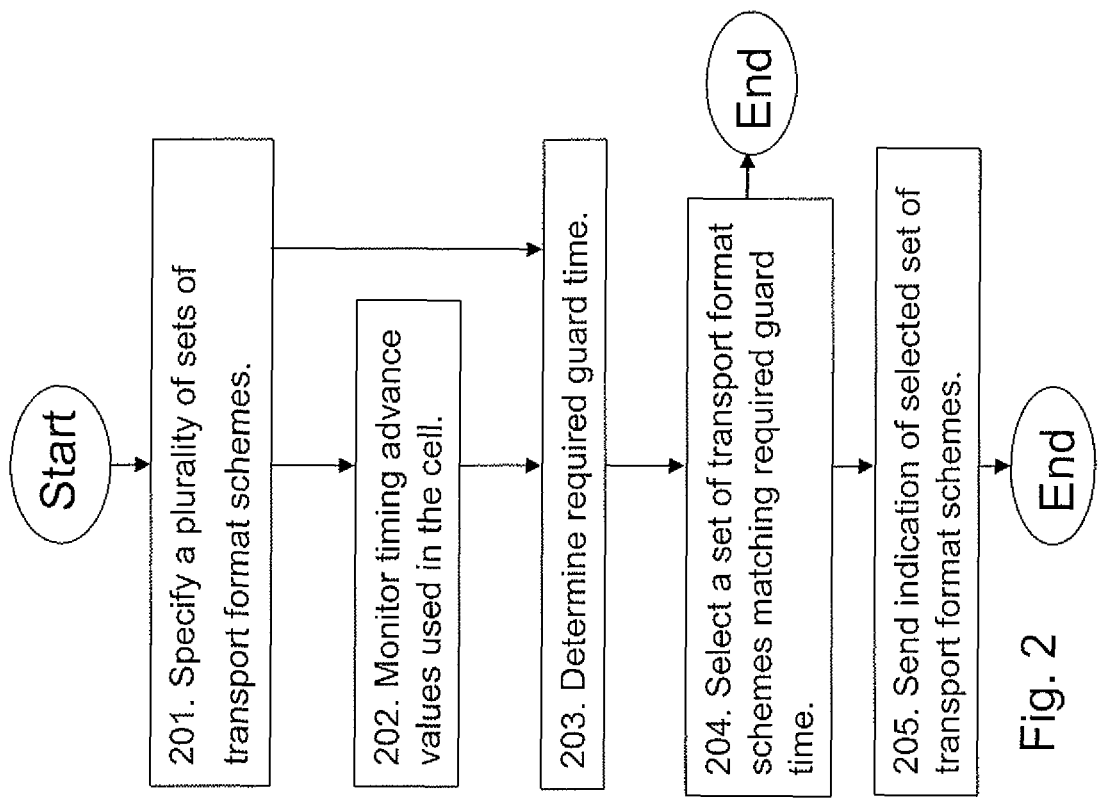
FIG. 2 is a flowchart depicting embodiments of a method in a base station.

Embodiments of a method in the base station 110 for selecting a set of transport format schemes for a cell 115 will now be described with reference to the flowchart depicted in FIG. 2. The set of transport format schemes shall be used for a radio transmission from the communication device 120 to the base station 110.

As mentioned above, the base station 110 is serving the cell 115 comprising the communication device 120, and the communication device 120 is unsynchronized for transmission to the base station 110.

In some embodiments, the communication device 120 is a machine type communication device or a user equipment.

The method comprises the following actions, which actions may as well be carried out in another suitable order than described below.

Action 201

The base station 110 specifies a plurality of sets of transport format schemes, wherein each set of transport format schemes is associated to a respective guard time. The guard time is a time margin required to compensate for the communication device 120 being unsynchronized for transmission to the base station 110.

A guard time provides a time margin between one uplink transmission from one device and a subsequent uplink transmission from another device on the same frequency with the purpose of avoiding interference between the two uplink transmissions.

In some embodiments, each of the plurality of sets of transport format schemes are represented by a set of contention based transmission mode specific transport format schemes and/or puncturing schemes.

To provide the flexibility required for an adaptive scheme, a plurality of sets of transport format schemes are specified, each corresponding to a certain guard time. For instance, one set for guard time G1, one set for guard time G2 (>G1), one set for guard time G3 (>G2), etc.

I.e. embodiments herein may use puncturing of existing transport formats, contention based access mode specific transport formats or a combination thereof. Puncturing is a process of removing selected redundant bits from data to be transmitted, such that the data still represents the complete original information but with less redundancy. Hence, contention based access mode specific puncturing schemes may be used to reduce a size of a transport block in order to provide an extended guard time. A transport block is a unit of data, which is transmitted as a single transmission event.

Note that combinations of contention based access mode specific transport formats and puncturing schemes are beneficial. For instance, one set of contention based access mode specific transport formats may through puncturing schemes be turned into several different sets, each set corresponding to a different guard time.

In some embodiments, this action 201 is performed such that each transport format scheme of each set of the plurality of sets of transport format schemes is adapted to different modulation schemes, coding schemes and/or different radio transmission resource sizes. In some embodiments the transport format scheme also is adapted to different amounts of data to transmit.

Action 202

In some embodiments, the base station 110 monitors timing advance values used by user equipments and/or machine type communication devices within the cell 115.

The monitoring may be performed during a period of time.

In some embodiments the monitoring comprises disregarding occurrences of divergent high timing advance values.

As mentioned above under action 202, the base station 110 may filter out or disregard occurrences of exceptionally large timing advance or recorded timing advance "peaks", which, although repetitively occurring, are used very infrequently.

Action 203

The base station 110 determines a required guard time as the maximum timing advance value used in the cell 115. The maximum timing advance value may vary with time, changing radio environment and cell planning, etc. The determining of a required guard time may be based on the monitoring action 202.

In some embodiments, the determining of a required guard time as the maximum timing advance value used in the cell, is performed by calculating a sliding average of the maximum timing advance values used in the cell in successive monitored time periods performed in action 202. A sliding average of values is defined as a series of successive averages of a number of values, or values measured over a specific time interval. During such a sliding average calculation the impact of a respective value on the average calculation may be weighted such that a new value has a greater weight, and thus a greater impact on the calculation result, than an older value. With this principle for the calculation the number of values contributing to the result is in principle unlimited. This calculation principle is often referred to as exponential averaging. With another principle for sliding average calculation a specified (maximum) number of values or a specified time period is used for each calculation and as each new value is included in calculating the average, the last value of the series is deleted.

This may be performed by e.g. exponential averaging, of the maximum recorded timing advance in successive measurement periods, e.g. $\tilde{T}_{max,n+1} = \alpha T_{max,n+1} + (\alpha-1)\tilde{T}_{max,n}$ where $\tilde{T}_{max,n}$ is the $n^{th}$ exponential average of the maximum required timing advance, $T_{max,n+1}$ is the maximum required timing advance during measurement period n+1 and α is a weight parameter determining the adaptation speed (0≤α≤1).

Action 204

The base station 110 selects one set of transport format schemes from the plurality of sets of transport format schemes to be available for the cell 115. The set is selected such that its associated guard time matches the determined required guard time in the cell 115.

With either $T_{max}$ or $\tilde{T}_{max}$ denoting the determined maximum timing advance this means that after determining the maximum required timing advance in the cell 115, the base station 110 sets the required guard time, $G_{req}$, of the cell to the maximum required timing advance, i.e. $G_{req}=T_{max}$ (or $G_{req}=\tilde{T}_{max}$), optionally with an added margin, i.e. $G_{req}=T_{max}+m$ (or $G_{req}=\tilde{T}_{max}+m$), where m is a margin m<<$T_{max}$ (or m<<$\tilde{T}_{max}$).

In this way the set of transport format schemes being selected is adapted to the timing uncertainty associated with uplink transmissions from the communication device 120 without uplink synchronization. I.e. resulting transport block size will not fill the entire allocated resource because it is intentionally made smaller than the allocated resources so that parts of the resource will be unused to serve as the guard time.

An advantage of embodiments herein is that the problem of inefficiently used resources and waste of system resources due to unnecessarily large guard times in a cellular network with widely varying cell sizes is overcome. The counteracting means according to embodiments herein comprises an adaptive selection of a set of transport format schemes being dynamically and adaptively selected to suit the requirements of each cell.

According to some embodiments, if the latest calculated guard time matches a different set of transport format schemes than the currently available set, the base station 110 may change the available set to the one matching the latest calculated guard time.

Action 205

In some embodiments, the base station 110 broadcasts an indication of the selected set of transport format schemes within the cell 115 to be obtained by the communication device. The selected set of transport format schemes may be indicated in a broadcasted system information. I.e. the available set may be indicated in the broadcast System Information (SI). There are different options for how this may be performed:

The base station 110 may list the selected set of transport format schemes of the available set.

The base station 110 may also indicate the allowed set as a set number which the communication device 120, through configuration, e.g. in Universal Subscriber Identity Module (USIM) or through signaling or hard coding, may translate into the actual transport format schemes in the set. USIM is an application and a set of data associated with the subscription. It is typically stored (and partly executed) on circuitry on a card denoted Universal Integrated Circuit Card (UICC) or Subscriber Identity Module (SIM) card.

As a further alternative all the plurality of sets may either be announced in the SI or known by the communication device 120, through configuration, e.g. in USIM or through signaling, or hard coding. The base station 110 may announce the required guard time in the SI and the communication device 120 selects a transport format from transport format schemes of the available set.

As an alternative, the base station 110 may unicast an indication of the available set of transport format schemes to the communication device 120.

In some embodiments the communication device 120 may be configured with this information via a dedicated Radio Resource Control (RRC) signalling from the base station 110 or even to associate one or a subset of the available set of transport format schemes with each allocated UL transmission resource, e.g. in an uplink grant signaled by the base station 110 e.g. on the Physical Downlink Control Channel (PDCCH) in LTE.

If the available set is announced in the SI, then the regular means and restrictions for updating of SI apply.

In some embodiments the indication of the selected set further comprises an indication of a specific available transport format scheme, or a specific subset of the available set of transport format schemes.

In all the above described alternatives for conveying transport format scheme information to the communication device 120 or configuring the communication device 120 with transport format scheme information, the transport format scheme information may include information related to either or both of transport format schemes and puncturing schemes.

In order to be able to make a well-founded choice of available set of transport format schemes, the radio base station monitors the timing advance used by user equipments and machine type communication devices in the cell 115, e.g. continuously or periodically. To do this the base station 110 may rely on timing advance commands given to the user equipments and machine type communication devices in conjunction with random access procedures, as random samples of the used timing advances. A random access procedure is a procedure through which a communication devices without uplink synchronization seeks access to uplink transmission resources. The device announces this with a short transmission of one of a limited set of short transmission patterns. If successfully detected by the base station this allows the base station to determine the required timing advance of the communication devices and the base station then informs the communication devices of this timing advance and allocates uplink transmission resources to the communication devices. In addition the base station 110 may keep track of accumulated relative timing advance commands given to each user equipment and machine type communication device, as a means of tracking the change of the timing advance after the last random access procedure. However, misalignments, i.e. differences between the timing advance as perceived by the base station 110 and the one actually used by the user equipment or machine type communication device, may occur due to lost commands, e.g. due to Hybrid Automatic Repeat Request (HARQ) failures. Hence the timing advance tracked through accumulation of relative timing advance commands will with time become increasingly less reliable. Therefore the base station 110 may not trust the "dead reckoning" that the tracking of accumulated relative timing advance commands represents for very long, but may instead stop the tracking after a certain possibly configurable period of time after a random access procedure.

The base station 110 may use the largest timing advance recorded during the last time period of a certain length, e.g. a day, a week, or a month, as a measure of the largest required timing advance, $T_{max}$, in the cell. Note that the maximum timing advance and guard time requirements may vary in a cell, due to changing radio conditions and changes in cell planning or deployment and cell configurations, e.g. base station antenna tilt and/or transmission power.

Timing advance is the time difference between a communication device's transmission in the uplink and the start of a transmission resource, e.g. a subframe in LTE, in the downlink as perceived by the communication device. That is, a communication device transmits uplink data slightly before the uplink transmission resource, e.g. LTE subframe, boundary as perceived from the downlink receptions. Thus, in essence, timing advance is a negative offset at the communication device, between the start of a received downlink resource, e.g. LTE subframe, and an uplink transmission, e.g. a transmitted uplink subframe in LTE. This negative offset is used to compensate for the propagation delay on the distance from the base station 110 to the communication devices and back again. The base station 110 monitors the timing misalignments in its receptions from the communication devices and sends timing advance commands, e.g. in a Media Access Control (MAC) control element in a MAC Protocol Data Unit (PDU) in LTE, in the form of relative changes, to communication devices when needed.

Figure 3:
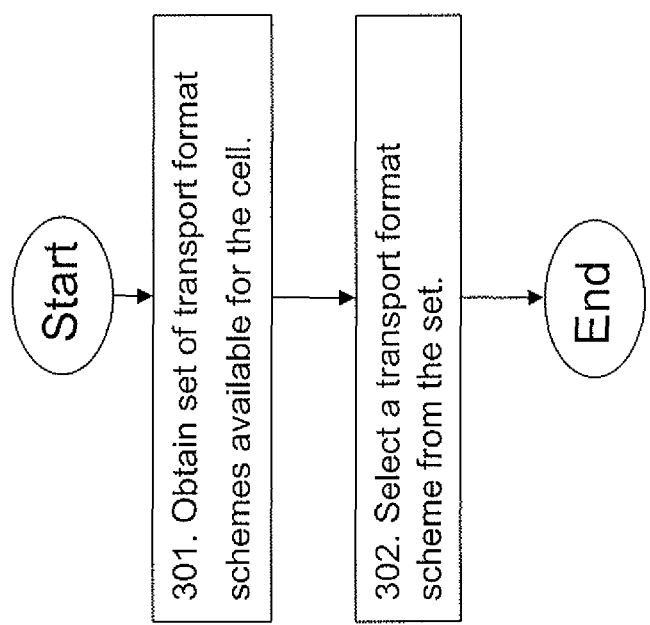
FIG. 3 is a schematic block diagram illustrating embodiments of a base station.

Embodiments of a method in the communication device 120 for selecting a transport format scheme will now be described with reference to the flowchart depicted in FIG. 3. The transport format scheme shall be used for a radio transmission of an amount of data from the communication device 120 to the base station 110. As mentioned above, the base station 110 is serving a cell 115 comprising the communication device 120. The communication device 120 is unsynchronized for transmission to the base station 110.

In some embodiments, the communication device 120 is a machine type communication device or a user equipment.

The method comprises the following actions, which actions may as well be carried out in another suitable order than described below.

Action 301

The communication device 120 obtains the set of transport format schemes available for the cell 115. The transport format schemes is associated to a guard time required in the cell 115. The guard time is a time margin required to compensate for the communication device 120 being unsynchronized for transmission to the base station 110.

In some embodiments this action is performed by preconfiguring the communication device 120 with the set of transport format schemes available for said cell 115.

In some embodiments, the set of transport format schemes available for said cell 115 is obtained by receiving from the base station 110, a broadcasted or unicasted indication of the selected set of transport format schemes.

Action 302

The communication device 120 selects a transport format scheme from the set of transport format schemes available for said cell 115. The selection is based on at least one of: the amount of data to be transmitted, a size of an allocated resource to be used for the data transmission, required transmission robustness impacting the modulation and coding scheme, and an uplink radio transmission condition. The uplink radio transmission condition may e.g. be measured by the communication device 120.

Generally the communication device 120 may measure the radio transmission condition by measuring the quality of received transmissions from the base stations. A typical example is where the communication device 120 measures the received power of a reference signal that is transmitted from the base station with a transmit power that is known to the communication device 120. The communication device 120 may also measure the quality, e.g. the bit error rate, of received data transmissions directed to the communication devices from the base station 110. Yet another example of how the transmission condition may be measured is that the base station 110 measures the quality, e.g. the bit error rate, of received data transmissions from the communication device 120 to the base station 110 and where the base station 110 feeds back this information in some manner to the communication device 120.

E.g. when the unsynchronized communication device 120 is to transmit data using a resource such as a set of one or more LTE transport blocks allocated by the base station for UL OTM transmission, it selects one of the available transport format schemes in the available set. When the data is transmitted to the base station 110, the base station 110 may use blind detection, i.e. trying the different available transport format schemes when receiving the uplink transmission.

Alternatively, the base station 110 may indicate a specific available transport format scheme, or a specific subset of the available set of transport format schemes e.g. matching the size of the allocated resource. This may be indicated in an uplink scheduling signaling when the base station 110 schedules the OTM resource, e.g. in an uplink grant on the PDCCH in LTE. With this alternative the unsynchronized communication device 120 may instead choose an OTM resource with which a suitable transport format scheme is associated which may result in that the communication device 120 has to wait for subsequent OTM uplink allocations.

Figure 4:
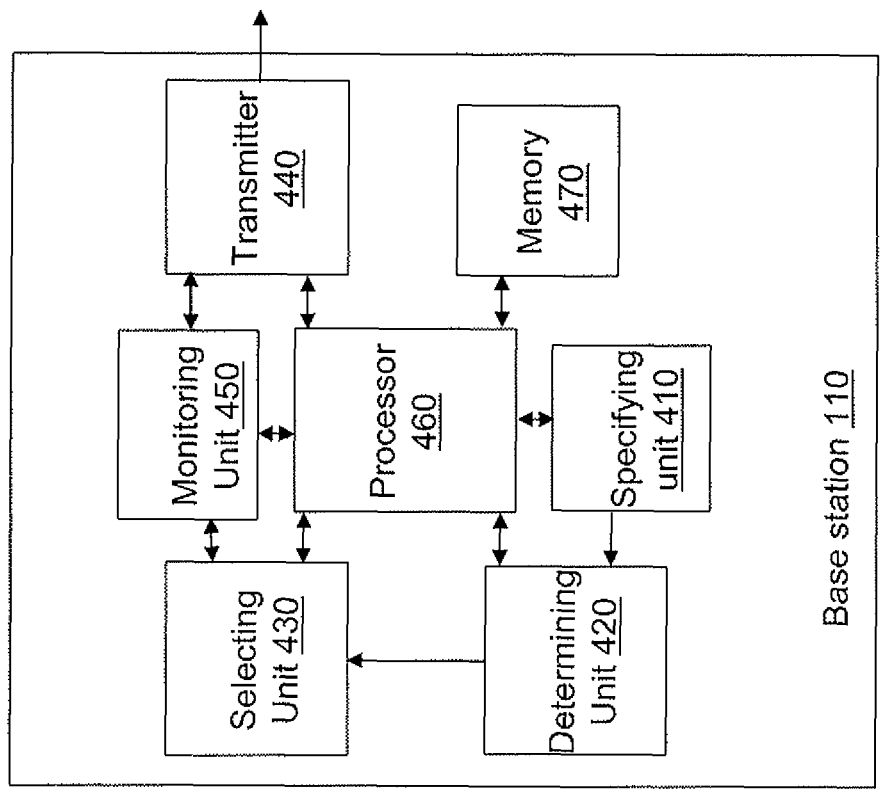
FIG. 4 is a flowchart depicting embodiments of a method in a communication device.

To perform the method actions in the base station 110 described above for selecting a set of transport format schemes for a cell 115, the base station 110 comprises the following arrangement depicted in FIG. 4. As mentioned above the set of transport format schemes shall be used for a radio transmission from the communication device 120 to the base station 110. The base station 110 is arranged to serve the cell 115 comprising the communication device 120. The communication device 120 is unsynchronized for transmission to the base station 110.

The base station 110 comprises a specifying unit 410 configured to specify a plurality of sets of transport format schemes, wherein each set of transport format schemes is associated to a respective guard time. The guard time is a time margin required to compensate for the communication device 120 being unsynchronized for transmission to the base station 110.

In some embodiments each of the plurality of sets of transport format schemes are represented by a set of contention based transmission mode specific transport format and/or puncturing schemes.

In some embodiments the specifying unit 410 further is configured to specify the plurality of sets such that each transport format scheme of each set of the plurality of sets of transport format schemes is adapted to different modulation schemes, coding schemes and/or different radio transmission resource sizes.

The base station 110 further comprises a determining unit 420 configured to determine a required guard time as the maximum timing advance value used in the cell 115.

The determining unit 420 may further be configured to determine the required guard time as the maximum timing advance value used in the cell, by calculating a sliding average of the maximum timing advance values used in the cell in successive monitored time periods.

The base station 110 further comprises a selecting unit 430 configured to select one set of transport format schemes from the plurality of sets of transport format schemes to be available for the cell 115, which set is selected such that its associated guard time matches the determined required guard time in the cell 115.

The base station 110 further comprises a transmitter 440. The transmitter 440 may be configured to broadcast an indication of the selected set of transport format schemes within the cell 115 to be obtained by the communication device 120, or to unicast the indication of the selected set of transport format schemes to the communication device 120.

The selected set of transport format schemes may be configured to be indicated in a broadcasted system information.

In some embodiments the base station 110 further comprises a monitoring unit 450 configured to monitor timing advance values used by user equipments and/or machine type communication devices within the cell 115. In these embodiments determining unit 420 may further be configured to determine the required guard time based on the monitoring.

The monitoring unit 450 may further be configured to monitor timing advance values used in the cell 115 during a period of time.

The monitoring unit 450 may further be configured to disregard occurrences of divergent high timing advance values.

The embodiments of the base station 110 for selecting a set of transport format schemes for a cell 115, may be implemented through one or more processors, such as a processor 460 in the base station 110 depicted in FIG. 4, together with computer program code for performing the actions of the embodiments herein. The program code mentioned above may also be provided as a computer program product, for instance in the form of a data carrier carrying computer program code for performing the embodiments herein when being loaded into the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 470 comprising one or more memory units. The memory 650 is arranged to be used to store data such as the specified plurality of sets of transport format schemes, the required guard time, the maximum timing advance values, schedulings, and applications to perform the actions of the embodiments herein when being executed in the base station.

Figure 5:
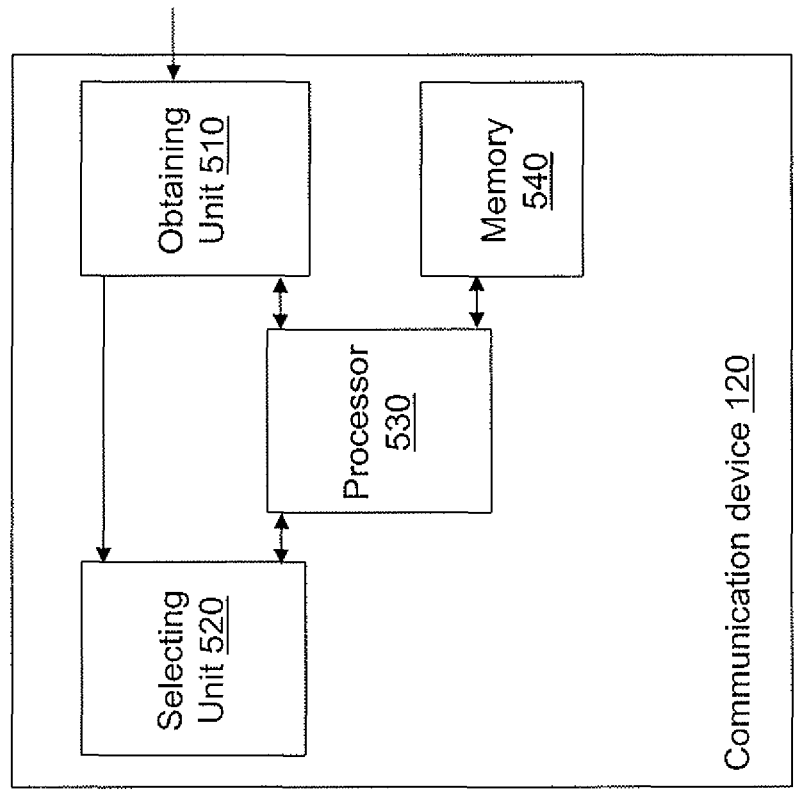
FIG. 5 is a schematic block diagram illustrating embodiments of a communication device.

To perform the method actions in the communication device 120 described above for selecting a transport format scheme, the communication device 120 comprises the following arrangement depicted in FIG. 5. As mentioned above the transport format scheme shall be used for a radio transmission of an amount of data from the communication device 120 to the base station 110. The base station 110 is arranged to serve a cell 115 comprising the communication device 120, and the communication device 120 is unsynchronized for transmission to the base station 110. The communication device 120 may be a machine type communication device or a user equipment.

The communication device 120 comprises an obtaining unit 510 configured to obtain the set of transport format schemes available for said cell 115. The transport format schemes are associated to a guard time required in the cell 115. The guard time is a time margin required to compensate for the communication device 120 being unsynchronized for transmission to the base station 110.

The obtaining unit 510 may further be configured to obtain the set of transport format schemes available for said cell 115 by being preconfigured with the set of transport format schemes available for said cell 115.

in some embodiments the obtaining unit 510 further is configured to obtain the set of transport format schemes available for said cell 115 by receiving from the base station 110, a broadcasted or unicasted indication of the selected set of transport format schemes.

The communication device 120 further comprises a selecting unit 520 configured to select a transport format scheme from the set of transport format schemes available for said cell 115. The selection is based on at least one of: the amount of data to be transmitted, a size of an allocated resource to be used for the data transmission and an uplink radio transmission condition.

The embodiments of the communication device 120 for selecting a transport format scheme may be implemented through one or more processors, such as a processor 530 in the communication device 120 depicted in FIG. 5, together with computer program code for performing actions of the embodiments herein. The program code mentioned above may also be provided as a computer program product, for instance in the form of a data carrier carrying computer program code for performing the embodiments herein when being loaded into the communication device 120. One such carrier may be in the form of a CD ROM disc. It is however feasible with other data carriers such as a memory stick. The computer program code may furthermore be provided as pure program code on a server and downloaded to the communication device 120.

The communication device 120 may further comprise a memory 540 comprising one or more memory units. The memory 540 is arranged to be used to store data such as an obtained set of transport format schemes available for the cell 115, selected transport format scheme, schedulings, and applications to perform the actions of the embodiments herein when being executed in the communication device 120.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, in a base station, for selecting a set of transport format schemes for a cell, the set of transport format schemes to be used for a radio transmission from a communication device to the base station, the base station serving the cell comprising the communication device, the communication device being unsynchronized for transmission to the base station, the method comprising:
   specifying a plurality of sets of transport format schemes, each set of transport format schemes associated with a respective guard time so that a first set of transport format schemes has a different guard time than a second set of transport format schemes and the first set of transport format schemes is different from the second set of transport format schemes, the guard time being a time margin required to compensate for the communication device being unsynchronized for transmission to the base station;
   determining a required guard time as a maximum timing advance value used in the cell; and
   selecting, based on the required guard time, one set of transport format schemes from the plurality of sets of transport format schemes to be available for the cell so that a guard time associated with the selected set matches the determined required guard time in the cell.

2. The method of claim 1, wherein each of the plurality of sets of transport format schemes are represented by a set of contention based transmission mode specific transport format and/or puncturing schemes.

3. The method of claim 1, wherein the specifying a plurality of sets is performed such that each transport format scheme of each set of the plurality of sets of transport format schemes is adapted to different at least one of:
   modulation schemes;
   coding schemes; and
   radio transmission resource sizes.

4. The method of claim 1, further comprising:
   either broadcasting an indication of the selected set of transport format schemes within the cell to be obtained by the communication device, or
   unicasting an indication of the selected set of transport format schemes to the communication device.

5. The method of claim 4, wherein the selected set of transport format schemes is indicated in broadcasted system information.

6. The method of claim 4, wherein the indication comprises an indication of a specific available transport format scheme or a specific subset of the available set of transport format schemes.

7. The method of claim 1, further comprising:
   monitoring timing advance values used by user equipment and/or machine type communication devices within the cell; and
   wherein the determining a required guard time is based on the monitoring.

8. The method of claim 7, wherein the monitoring timing advance values used in the cell is performed during a period of time.

9. The method of claim 8, wherein the determining a required guard time is performed by calculating a sliding average of maximum timing advance values used in the cell in successive monitored time periods.

10. The method of claim 7, wherein the monitoring comprises disregarding occurrences of divergent high timing advance values.

11. The method of claim 1, wherein the communication device is a machine type communication device.

12. A base station for selecting a set of transport format schemes for a cell, the set of transport format schemes to be used for a radio transmission from a communication device to the base station, the base station configured to serve the cell comprising the communication device, the communication device being unsynchronized for transmission to the base station, the base station comprising:
one or more processing circuits configured to function as:
a specifying circuit configured to specify a plurality of sets of transport format schemes, each set of transport format schemes associated with a respective guard time so that a first set of transport format schemes has a different guard time than a second set of transport format schemes and the first set of transport format schemes is different from the second set of transport format schemes, the guard time being a time margin required to compensate for the communication device being unsynchronized for transmission to the base station;
a determining circuit configured to determine a required guard time as a maximum timing advance value used in the cell; and
a selecting circuit configured to select, based on the required guard time, one set of transport format schemes from the plurality of sets of transport format schemes to be available for the cell so that a guard time associated with the selected set matches the determined required guard time in the cell.

13. The base station of claim 12, wherein each of the plurality of sets of transport format schemes are represented by a set of contention based transmission mode specific transport format and/or puncturing schemes.

14. The base station of claim 12, wherein the specifying circuit is further configured to specify the plurality of sets such that each transport format scheme of each set of the plurality of sets of transport format schemes is adapted to different at least one of:
modulation schemes;
coding schemes; and
radio transmission resource sizes.

15. The base station of claim 12, further comprising a transmitter configured to:
either broadcast an indication of the selected set of transport format schemes within the cell to be obtained by the communication device; or
unicast the indication of the selected set of transport format schemes to the communication device.

16. The base station of claim 15, wherein the selected set of transport format schemes is configured to be indicated in broadcasted system information.

17. The base station of claim 12:
wherein the one or more processing circuits are further configured to function as a monitoring circuit configured to monitor timing advance values used by user equipment and/or machine type communication devices within the cell; and
wherein the determining circuit is configured to determine the required guard time based on the monitoring.

18. The base station of claim 17, wherein the monitoring circuit is configured to monitor timing advance values used in the cell during a period of time.

19. The base station of claim 18, wherein the monitoring circuit is configured to disregard occurrences of divergent high timing advance values.

20. The base station of claim 18, wherein the determining circuit is configured to determine the required guard time by calculating a sliding average of maximum timing advance values used in the cell in successive monitored time periods.

* * * * *